(12) United States Patent
Colegrove et al.

(10) Patent No.: US 10,106,221 B2
(45) Date of Patent: *Oct. 23, 2018

(54) BICYCLE REAR WHEEL SUSPENSION SYSTEM

(71) Applicant: Trek Bicycle Corporation, Waterloo, WI (US)

(72) Inventors: James Colegrove, Lake Mills, WI (US); Dylan Howes, Monona, WI (US); Jose Gonzalez, Santa Carita, CA (US); Michael Hammond, Monona, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/168,719

(22) Filed: May 31, 2016

(65) Prior Publication Data

US 2016/0272273 A1  Sep. 22, 2016

Related U.S. Application Data

(60) Continuation of application No. 14/506,979, filed on Oct. 6, 2014, now Pat. No. 9,376,162, which is a continuation of application No. 13/550,721, filed on Jul. 17, 2012, now Pat. No. 8,882,127, which is a continuation of application No. 12/901,893, filed on Oct. 11, 2010, now Pat. No. 8,235,409, and a continuation of application No. 12/719,114, filed on Mar. 8, 2010, which is a division of application No. 11/839,931, filed on Aug. 16, 2007, now Pat. No. 7,703,785, said application No. 12/901,893 is a continuation of application No. 11/735,816, filed on Apr. 16, 2007, now Pat. No. 7,837,213.

(51) Int. Cl.
  *B62K 25/28* (2006.01)
  *B62K 25/04* (2006.01)

(52) U.S. Cl.
  CPC ............ *B62K 25/04* (2013.01); *B62K 25/286* (2013.01)

(58) Field of Classification Search
  CPC ....... B62K 25/04; B62K 25/28; B62K 25/286
  See application file for complete search history.

(56) References Cited

U.S. PATENT DOCUMENTS

| | | | | |
|---|---|---|---|---|
| 7,703,785 B2 * | 4/2010 | Colegrove | ............. | B62M 9/125 |
| | | | | 280/260 |
| 7,837,213 B2 * | 11/2010 | Colegrove | ............. | B62K 25/04 |
| | | | | 280/284 |
| 8,235,409 B2 * | 8/2012 | Colegrove | ............. | B62K 25/04 |
| | | | | 280/284 |

(Continued)

*Primary Examiner* — Tony H Winner
(74) *Attorney, Agent, or Firm* — Boyle Fredrickson S.C.

(57) ABSTRACT

A bicycle frame assembly having a number of rotatable members configured to absorb shocks and impacts associated with operation of the bicycle. The assembly includes a frame constructed to support a rider and a chain stay having a rearward end that extends toward a wheel hub and a forward end that is pivotably connected to the frame. An absorber is pivotably connected to the forward end of the chain stay and extends to a rocker arm that is pivotably connected to the frame. A seat stay is pivotably connected to a rearward end of the rocker arm and extends to the rearward end of the chain stay. The rearward ends of the seat stay and the chain stay are pivotably connected to rotate about a common axis.

20 Claims, 6 Drawing Sheets

(56) References Cited

U.S. PATENT DOCUMENTS

| | | | | |
|---|---|---|---|---|
| 8,882,127 B2* | 11/2014 | Colegrove | ............. | B62K 25/04 |
| | | | | 280/284 |
| 9,376,162 B2* | 6/2016 | Colegrove | ............. | B62K 25/04 |
| 2005/0253357 A1* | 11/2005 | Chang | ................... | B62K 25/286 |
| | | | | 280/283 |
| 2007/0246909 A1* | 10/2007 | Weng | ................... | B62K 25/286 |
| | | | | 280/284 |
| 2008/0067772 A1* | 3/2008 | Weagle | ................ | B62K 25/286 |
| | | | | 280/124.134 |
| 2008/0252040 A1* | 10/2008 | Colegrove | ........... | B62K 25/286 |
| | | | | 280/284 |
| 2009/0001685 A1* | 1/2009 | Talavasek | ............ | B62K 25/286 |
| | | | | 280/281.1 |
| 2009/0283986 A1* | 11/2009 | Falke | ..................... | B62K 19/38 |
| | | | | 280/284 |
| 2013/0093160 A1* | 4/2013 | Alsop | .................. | B62K 25/286 |
| | | | | 280/284 |

* cited by examiner

BICYCLE REAR WHEEL SUSPENSION SYSTEM

CROSS-REFERENCE TO RELATED APPLICATIONS

This application claims priority to and is a Continuation of U.S. application Ser. No. 14/506,979, filed on Oct. 6, 2014, now U.S. Pat. No. 9,376,162, which is a Continuation of U.S. application Ser. No. 13/550,721, filed on Jul. 17, 2012, now U.S. Pat. No. 8,882,127, which is a Continuation of U.S. application Ser. No. 12/901,893, filed Oct. 11, 2010, now U.S. Pat. No. 8,235,409, which is a Continuation of U.S. application Ser. No. 11/735,816, filed on Apr. 16, 2007, now U.S. Pat. No. 7,837,213 all of which are incorporated herein in their entirety. U.S. application Ser. No. 13/550,721, filed Jul. 17, 2012, now U.S. Pat. No. 8,882,127 is also a Continuation of U.S. application Ser. No. 12/719,114, filed Mar. 8, 2010, which is abandoned, which is a Divisional of U.S. application Ser. No. 11/839,931, filed Aug. 16, 2007, now U.S. Pat. No. 7,703,785 and which are incorporated herein in their entirety.

BACKGROUND OF THE INVENTION

The present invention relates generally to bicycles and, more particularly, to a suspension system for a rear wheel of the bicycle.

The primary structural component of a conventional two-wheel bicycle is the frame. On a conventional road bicycle, the frame is typically constructed from a set of tubular members assembled together to form the frame. For many bicycles, the frame is constructed from members commonly referred to as the top tube down tube seat tube, seat stays and chain stays, and those members are joined together at intersections commonly referred to as the head tube, seat post, bottom bracket and rear dropout. The top tube usually extends from the head tube rearward to the seat tube. The head tube, sometimes referred to as the neck, is a short tubular structural member at the upper forward portion of the bicycle which supports the handlebar and front steering fork, which has the front wheel on it. The down tube usually extends downwardly and rearward from the head tube to the bottom bracket, the bottom bracket usually comprising a cylindrical member for supporting the pedals and chain drive mechanism winch powers bicycle. The seat tube usually extends from the bottom bracket upwardly to where it is joined to the rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from the top of the seat tube. The chain stays and seat stays are normally joined together with a rear dropout for supporting the rear axle of the rear wheel. The portion of the frame defined by the head tube, seat post and bottom bracket and the structural members that join those three items together can be referred to as the main front triangular portion of the frame, with the seat stays and chain stays defining a rear triangular portion of the frame. The foregoing description represents the construction of a conventional bicycle frame which of course does not possess a suspension having any shock absorbing characteristics.

The increased popularity in recent years of off-road cycling, particularly on mountains and cross-country, has made a shock absorbing system in many instances a biking necessity. A bicycle with a properly designed suspension system is capable of traveling over extremely bumpy, uneven terrain and up or down very steep inclines. Suspension bicycles are less punishing, reduce fatigue and reduce the likelihood of injury to the rider, and are much more comfortable to ride. For off-road cycling in particular, a suspension system greatly increases the rider's ability to control the bicycle because the wheels remain in contact with the ground as they ride over rocks and bumps in the terrain instead of being bounced into the air as occurs on conventional non-suspension bicycles. Over the last several years the number of bicycles now equipped with suspension systems has dramatically increased. In fact, many bicycles are now fully suspended, meaning that the bicycle has both a front suspension and a rear suspension. Front suspensions were the first to become popular. Designed to remove the pounding to the bicycle front end, the front suspension is simpler to implement than a rear suspension. A front suspension fork is easy to retrofit onto an older model bicycle. On the other hand, a rear suspension will increase traction and assist in cornering and balance the ride.

During cycling, as the bicycle moves along a desired path, discontinuities of the terrain are communicated to the assembly of the bicycle and ultimately to the rider. Although such discontinuities are generally negligible for cyclists operating on paved surfaces, riders venturing from the beaten path frequently encounter such terrain. With the proliferation of mountain biking, many riders seek the more treacherous trail. Technology has developed to assist such adventurous riders in conquering the road less traveled. Wheel suspension systems arc one such feature.

Riding a fully suspended mountain bike along a rough, rock strewn trail, or even level riding on city and country roads, provides a new degree of safety and comfort to the rider. It is in downhill riding and racing that a rear suspension is most beneficial, but even on ordinary city and country roads, a rear suspension allows the rider to maintain a forward facing orientation to more safely view traffic and road conditions without paying disproportionate attention to stones and potholes immediately below in the rider's path. A number of pivoting "swing arm" suspensions have been developed for rear wheel suspensions on bicycles. In its simplest configuration, the chain stays, which on a conventional bicycle frame are rigidly mounted, are replaced by a pair of swing arms that are pivotably attached at their front ends to the generally fixed front triangular portion of the frame. The pivot is usually located near the bottom bracket where the pedal and crank are supported. The rear ends of the swing arms, which support the rear axle, move upward and downward in response to the rear wheel striking rocks, curbs and other obstructions. The range of movement of the swing arm usually is controlled by a shock absorber affixed between the swing arm and the main front frame. Although such systems have allowed riders to conquer more aggressive terrain, room for improvement still exists.

Many riders appreciate that braking on mountain bikes can feel "chattery", or as though the wheel is skipping over the terrain rather than rolling thereover. This chatter can detract from rider comfort and confidence as well as adversely affect bicycle performance. During normal operation, as the wheel moves across the ground, a contact patch of the tire is defined as the area of the tire that engages the ground surface. During translation of the suspension system relative to the frame, the contact patch rotates about the tire relative to an axis of rotation of the tire. Typically, the contact patch rotates 10 to 23 degrees for bikes having a suspension which travel ranging from about 122 to approximately 180 millimeters. Other suspension systems provide contact patch rotation in the range of 7 to 12 degrees for bicycles having 120 to 250 millimeters of suspension travel. Rotation of the contact patch contributes to the operational chatter perceived by the rider. Accordingly, it is desired to provide a suspension system having a reduced contact patch rotation.

Braking forces also affect operation of the suspension system. Braking forces can cause the suspension system to compress or extend based, in part, on the orientation of the brake system with respect to the movable links of the suspension and/or the fixed portion constructed to support the rider. Improper association of the brake system with the rear wheel and the movable members of the suspension system can detrimentally affect bicycle performance as well as stopping ability. During braking, rider momentum generates a forward weight shift which acts to compress the front suspension while extending the rear suspension. The extension of the rear suspension system un-weights the rear wheel and tends to reduce rear tire traction. The reduction in rear tire traction adversely affects braking power in that, if the rear tire traction is sufficiently reduced, the rear tire may be allowed to slide along the ground surface. Such an event can distract a rider and may adversely affect the rider's ability to maintain control of the bicycle. If the loss of rear tire traction during braking, or skid, is unanticipated by the rider, the rider may even crash. Accordingly, it is also desired to provide a suspension system that enhances the attitude of the bicycle during braking so as to provide at least partial compression of the suspension system through a majority of braking conditions.

BRIEF DESCRIPTION OF THE INVENTION

The present invention provides a frame assembly and suspension system that overcomes the aforementioned drawbacks. A frame according to a number of the aspects of the invention includes a number of interconnected rotatable members that are configured to absorb shocks and impacts associated with operation of the bicycle. The suspension system includes a chain stay and a seat stay pivotably connected to a frame constructed to support a rider. A rearward axis of rotation of the chain stay and the seat stay are generally concentrically orientated with respect to an axis of rotation of a rear wheel, i.e. a rear wheel axle. Such a construction provides a suspension system that is highly tunable as well as configured to maintain operation of the rear wheel braking system throughout a majority of the travel range of the rear wheel suspension system.

One aspect of the invention discloses a bicycle frame assembly having a frame for supporting a rider and a swing arm and seat stay movably connected to the frame. The swing arm has a first end that is pivotably connected to the frame and a second end for pivotably engaging a rear wheel assembly. The seat stay is pivotably connected to the rear wheel assembly such that the seat stay, the swing arm, and a rear wheel have a common axis of rotation. Such a construction functions to reduce the size of the contact patch of the rear wheel during operation.

A bicycle rear wheel suspension system according to another aspect of the invention is disclosed as having a number of interconnected links. A first link is pivotably connected to a frame member and has a first section that extends rearward of the frame member for supporting a wheel and a second section that extends forward of the frame member. A rocker arm is pivotably connected to the frame and has a first portion that extends rearward of the frame member and a second portion that extends forward of the frame member. A second link is pivotably disposed between the first section of the first link and the first portion of the rocker arm such that the first link can the second link can rotate about a common axis. The system includes an arrestor that has a first end connected to the second section of the first link and a second end connected to the second portion of the rocker arm. Accordingly, the arrestor is free-floating or not otherwise rigidly connected to the frame.

A further aspect of the invention discloses a bicycle frame having a first portion for supporting a rider and a number of interconnected pivotable members. An arm is pivotably attached to the first portion of the frame. A first member is pivotably attached to the first portion and has a first end and a second end. The first end of the first member is connected to the arm by an absorber. A second member also includes a first end and a second end. The first end is connected to an end of the arm generally opposite the absorber and the second end is pivotably connected to the second end of the first member such that the first and second members are rotatable about a common axis.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
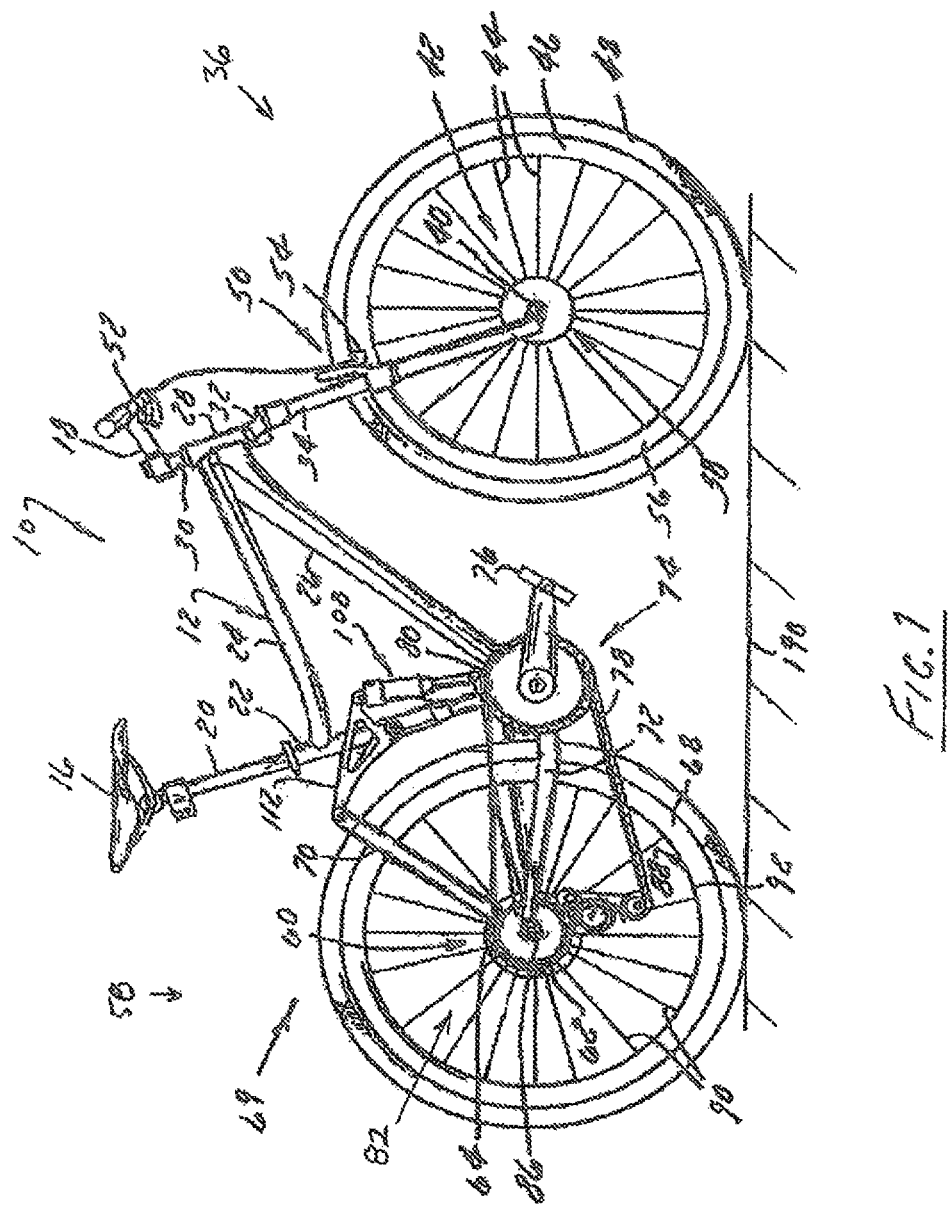
FIG. 1 is an elevational view of a bicycle equipped with a frame and suspension system according to the present invention.

FIG. 1 shows a bicycle 10 having a frame assembly 12 equipped with a rear wheel suspension system according to the present invention. Bicycle 10 includes a seat 16 and handlebars 18 that are attached to frame assembly 12. A seat post 20 is connected to seat 16 and slidably engages a seat tube 22 of frame assembly 12. A top tube 24 and a down tube 26 extend forwardly from seat tube 22 to a head tube 28 of frame assembly 12. Handlebars 18 are connected to a stem 30 that passes through head tube 28 and engages a fork crown 32. A pair of forks 34 extend from generally opposite ends of fork crown 32 and are constructed to support a front wheel assembly 36 at an end of each fork or a fork tip 38. Fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebars 18 and a pair of brake pads 54 positioned on generally opposite sides of front wheel assembly 36. Brake pads 54 are constructed to engage a brake wall 56 of rim 46 thereby providing a stopping or slowing force to front wheel assembly 36. A rear wheel assembly 58 includes a disc brake assembly 60 having a rotor 62 and a caliper 64 that are positioned proximate a rear axle 66. A rear wheel 68 is positioned generally concentrically about rear axle 66. Understandably, front wheel assembly 36 and rear wheel assembly 58 could be equipped with a brake assembly generally similar to front brake assembly 50 or disc brake assembly 60.

A rear wheel suspension system 69 is pivotably connected to frame 12 to allow rear wheel 68 to move independent of seat 16 and handlebars 18. Suspension system 69 includes a seat stay 70 and a chain stay 72 that offset rear axle 66 from a crankset 74. Crankset 74 includes a pedal 76 that is operationally connected to a chain 78 via a chain ring or sprocket 80. Rotation of chain 78 communicates a drive force to a rear section 82 of bicycle 10. A gear cluster 84 is positioned at rear section 82 and engaged by chain 78. Gear cluster 84 is generally concentrically orientated with respect to rear axle 66 and includes a number of variable diameter gears. Gear cluster 84 is operationally connected to a hub 86 of a rear wheel 88 of rear wheel assembly 58. A number of spokes 90 extend radially between hub 86 and a rim 92 of rear wheel 88. As is commonly understood, rider operation of pedals 76 drives chain 78 thereby driving rear wheel 88 which in turn propels bicycle 10.

Figure 2:
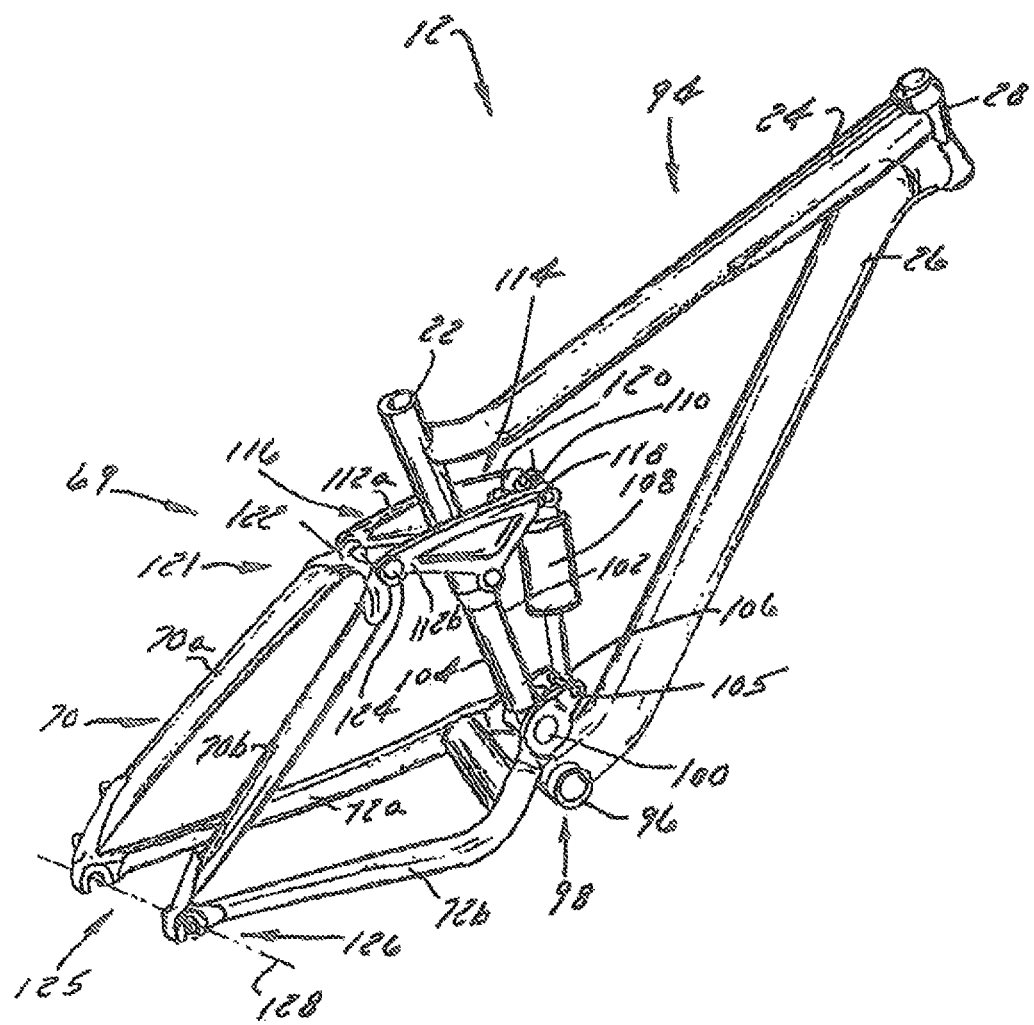
FIG. 2 is a perspective view of the frame assembly shown in FIG. 1.

As shown in FIG. 2, frame assembly 12 includes a first portion 94 that generally includes seat tube 22, top tube 24, down tube 26, and head tube 28. A bottom bracket 96 is formed proximate the interface of seat tube 22 and down tube 26 and is constructed to operatively connect crankset 74 to bicycle frame assembly 12. A first end 98 of chain stay 72 is pivotably connected to seat tube 22 proximate bottom bracket 96. A pivot pin 100 passes through seat tube 22 generally between a forward edge 102 and a rearward edge 104 of seat tube 22. Pivot pin 100 pivotably connects alternate side chain stays 72a, 72b to seat tube 22. A portion 105 of chain stays 72a, 72b extends forward of seat tube 22 and is constructed to engage a first end 106 of an absorber, or shock absorber 108. A second end 110 of shock absorber 108 is pivotably connected to a rocker arm 112 that is pivotably connected to seat tube 22. Preferably, shock absorber 108 is a gas shock absorber configured to contain a compressed volume of gas. Other absorber constructions, such as a spring-based absorber or a fluid-based shock absorber are envisioned and within the scope of the claims.

Rocker arm 112 includes a first portion 114 that extends forward of seat tube 22 and a second portion 116 that extends rearwardly from seat tube 22. A pivot pin 118 secures rocker arm 112 to seat tube 22 and a web wall 120 extends between generally opposite sides 112a, 112b of rocker arm 112 such that opposite sides 112a, 112b of rocker arm 112 generally flank seat tube 22. Second portion 116 of rocker arm 112 extends rearward from seat tube 22 and is pivotably connected to a first end 121 of seat stay 70. Seat stay 70 includes generally opposite sides 70a, 70b that are connected at first end 121 by a bracket 122. A pivot pin 124 pivotably connects second portion 116 of rocker arm 112 to first end 121 of seat stays 70a, 70b.

A second end 125 of seat stays 70a, 70b is pivotably connected to a second end 126 of chain stays 72a, 72b. An axis of rotation between seat stays 70a, 70b and chain stays 72a, 72b, indicated by line 128, is generally concentrically oriented to rear axle 66. That is, rear axle 66, seat stays 70a, 70b, and chain stays 72a, 72b are connected to be rotatable about a common axis, i.e. axis 128.

Figure 3:
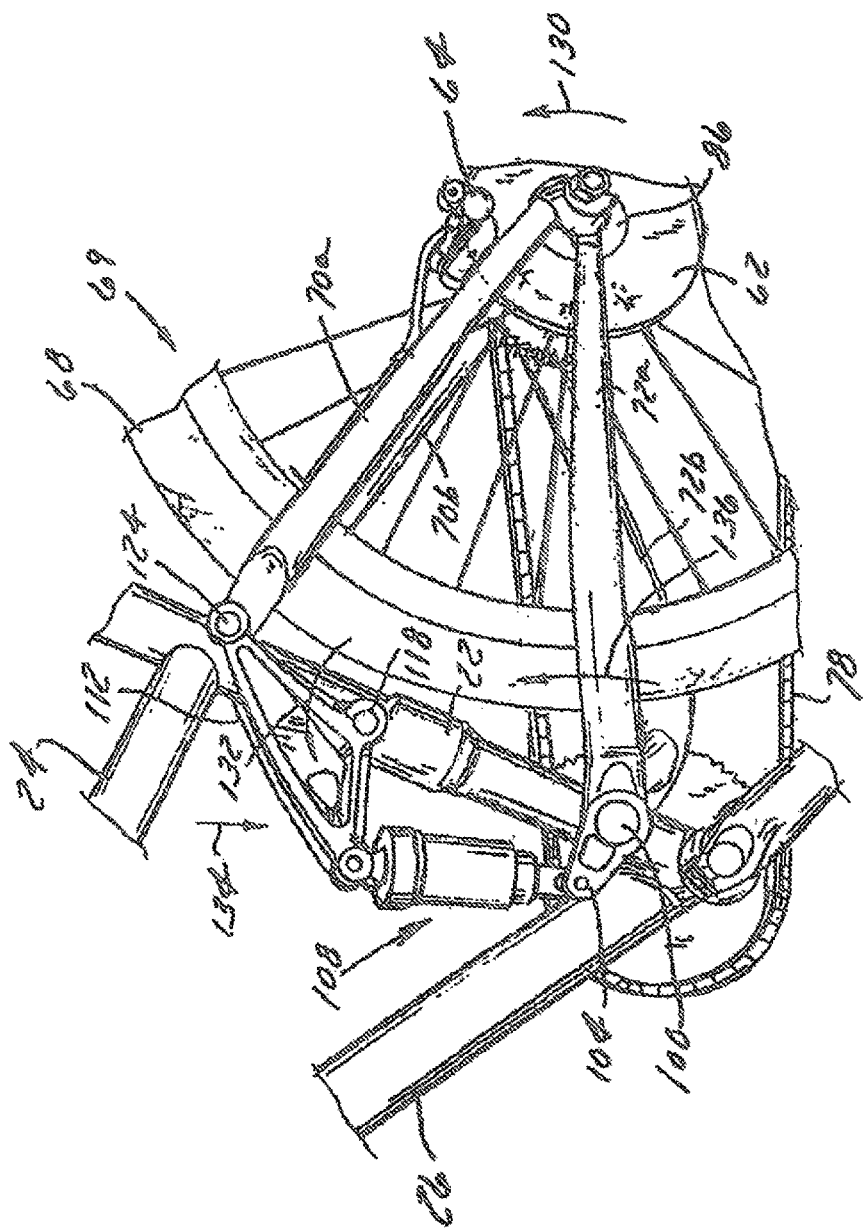
FIG. 3 is an elevational view of a portion of the bicycle shown in FIG. 1 with the suspension system in a compressed position.
Figure 4:
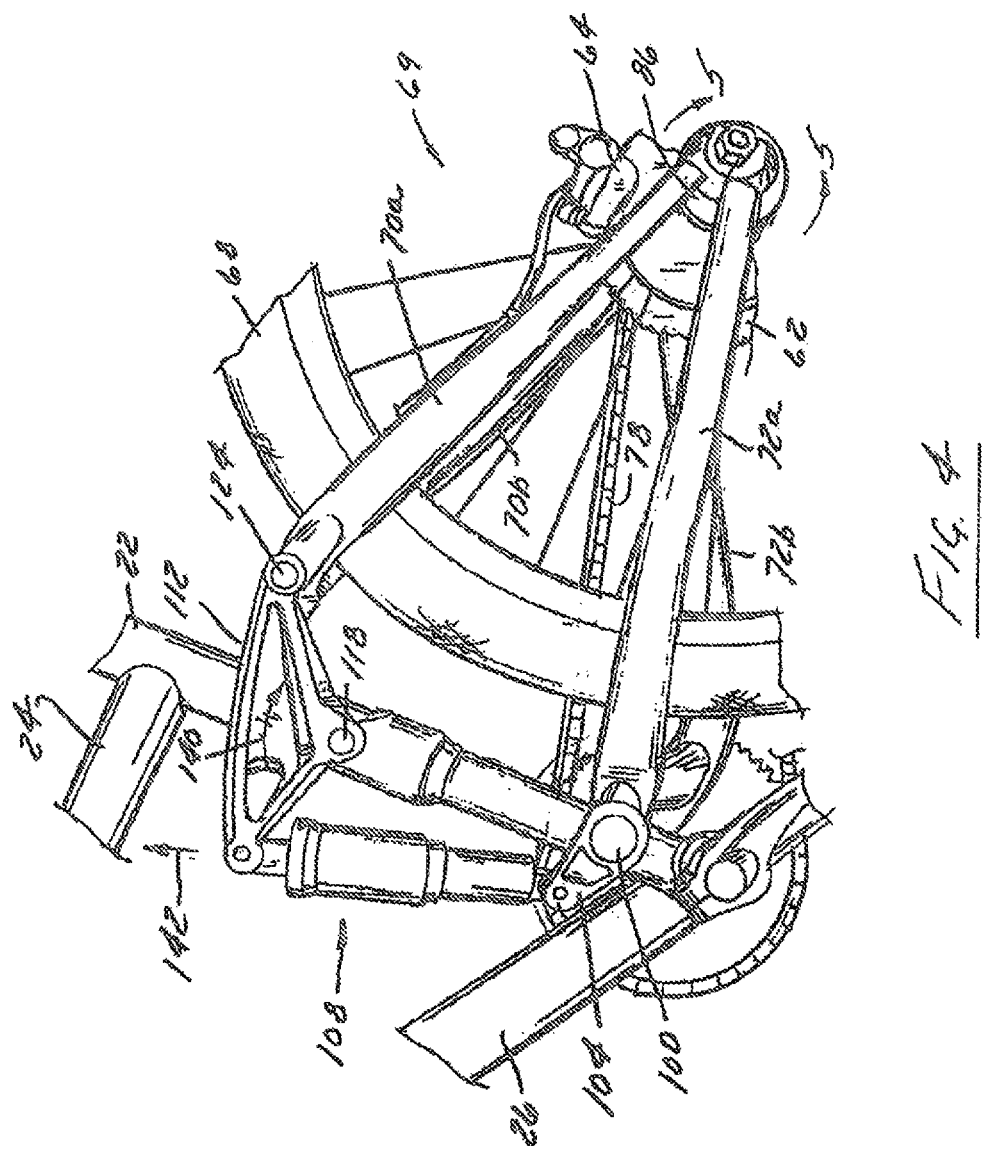
FIG. 4 is a view similar that shown in FIG. 3 with the suspension system in an extended position.

As shown in FIGS. 3 and 4, in addition to the relative rotation between seat stays 70a, 701, and chain stays 72a, 72b, seat stays 70a, 70b are also rotatable relative to rocker arm 112 about pivot pin 124. Chain stays 72a, 72b are also rotatable relative to seat tube 22 about pivot pin 100. As shown in FIG. 3, when subjected to an impact, that portion of suspension system 69 rearward of seat tube 22 rotates generally upward, indicated by arrow 130. This action rotates rocker arm 112 about pivot pin 118 in the direction indicated by arrow 132 thereby subjecting shock absorber 108 to a compressive force, indicated by arrow 134. During this same movement, of rocker arm 112, chain stays 72a, 72b rotate in the direction indicated by arrow 136 about pivot pin 100. This action displaces forward portion 105 of chain stays 72a, 72b in the same direction as force 134 thereby allowing a portion of force 134 to be absorbed by the mechanical association of seat stays 70a, 70b and chain stays 72a, 72b.

As shown in FIG. 4, when rear wheel 68 overcomes an obstacle or other impact, suspension system 69 returns to a generally unloaded orientation such that there is a collective rotation of rocker arm 112, seat stays 70, and chain stays 72 in the direction, indicated by arrow 140. Rotation 140 is associated with the restoring force, indicated by arrow 142, generated by shock absorber 108.

Still referring to FIGS. 3 and 4, rotor 62 of brake assembly 60 is attached to hub 86 of rear wheel 68. Actuation of caliper 64 engages the pads of caliper 64 with rotor 62 thereby imparting a stopping force to wheel 68. Caliper 64 is fixedly connected to seat stay 70 such that, during a breaking operation, suspension system 69 is allowed to move in a primarily upward direction rather than a rearward direction. Such a configuration allows suspension system 69 to maintain the attitude of bicycle 10 during a braking operation by limiting the compression of shock absorber 108 by maintaining the weighting of rear wheel 68.

Figure 5:
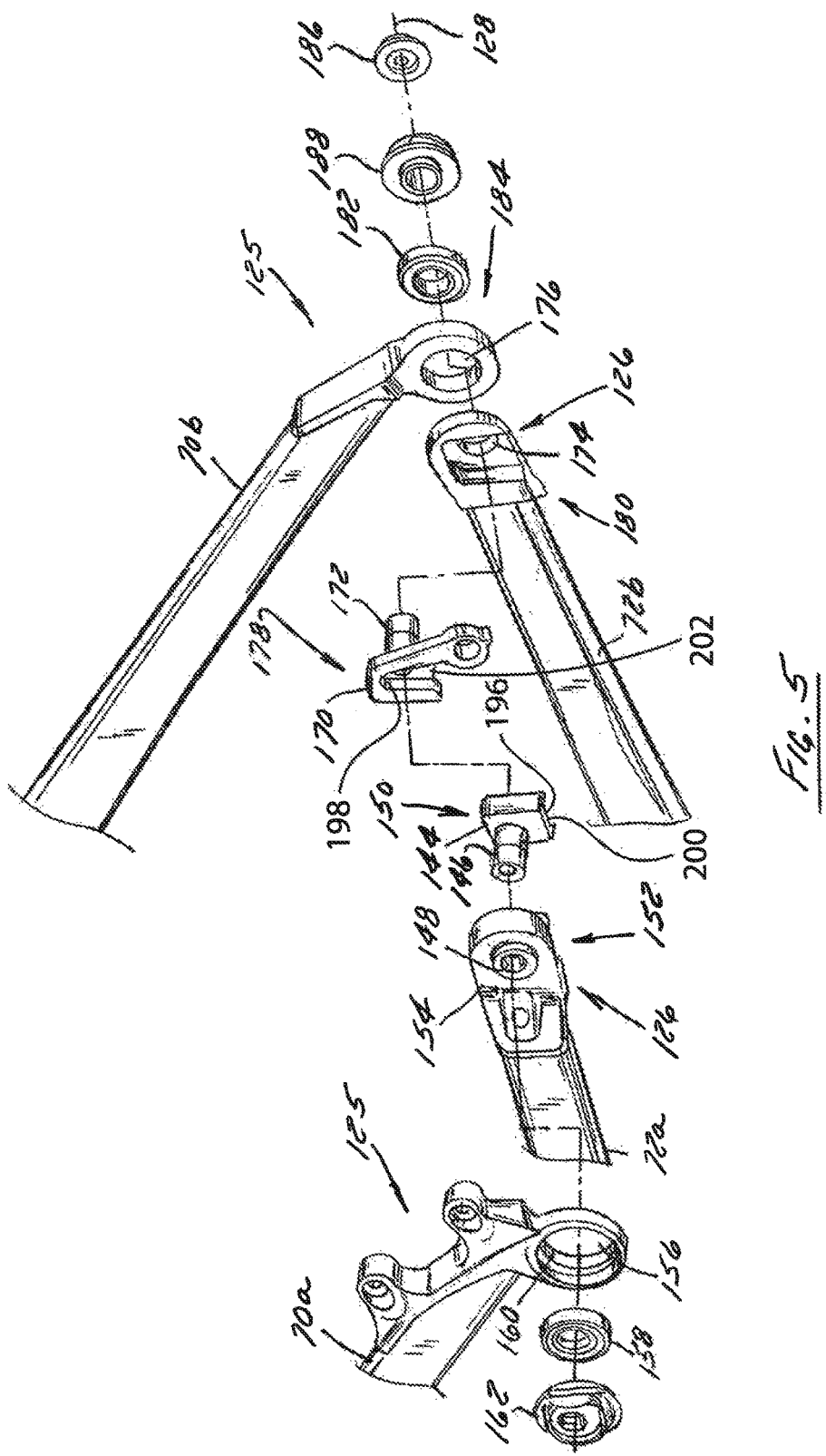
FIG. 5 is an exploded view of a rear portion of the suspension system generally along line 5-5 shown in FIG. 4.

FIG. 5 shows an exploded view of the assembly of the coaxial connection of seat stays 70a, 70b and chain stays 72a, 72b. A first insert 144 includes a stem 146 that is constructed to pass into an opening 148 formed in second end 126 of chain stay 72a. Insert 144 includes a contour or head portion 150 that is constructed to generally correspond to a contour 152 formed in second end 126 of chain stay 72a proximate opening 148. Additionally, insert 144 includes a groove 196 for receiving the rear wheel assembly 58. The head portion 150 also has a pocket 200, which allows the rear wheel 68 to drop out when the rear axle 66 is removed. A lip 154 is formed about opening 148 and extends from a side of chain stay 72a generally opposite insert 144. Lip 154 is constructed to generally align opening 148 of chain stay 72a and an opening 156 formed in second end 125 of seat stay 70a. Such a construction ensures the generally concentric and coaxial alignment of chain stay 72a and seat stay 70a with axis of rotation 128. Second end 125 of seat stay 70a is constructed to receive a bearing 158 within a cavity 160 formed in second end 125. An end cap 162 engages axle 66 so as to secure bearing 158 in cavity 160. Bearing 158 and opening 148 of chain stay 72a are constructed to engage stem 146 of insert 144 such that chain stay 72a and seat stay 70a a rotate independently about axis 128. Such a construction allows for independent and coaxial rotation of seat stay 70a and chain stay 72a relative to axis 128. Similarly, a second insert 170 includes a stem 172 that is constructed to pass through an opening 174 formed in chain stay 72b and an opening 176 formed in seat stay 70b. Insert 170 includes a contour or head portion 178 that generally corresponds to a contour 180 of second end 126 of chain stay 72b. Such a mating orientation prevents rotation of second insert 170 relative to chain stay 72b. Insert 170 also includes a groove 198 for receiving the rear wheel assembly 58. The head portion 178 also has a pocket 202, which allows the rear wheel 68 to similarly drop out in a vertical direction when the rear axle 66 is removed. A bearing 182 engages a cavity 184 formed in second end 125 of seat stay 70b and engages stem 172 of insert 170. An end cap 186 and a spacer 188 are positioned proximate bearing 182 and configured to engage stem 172 of insert 170. Spacer 188 is constructed to generally enclose bearing 182 within cavity 184 and prevents dirt or other debris from fouling bearing 182.

When fully assembled, rear wheel assembly 58 is constructed to be received between insert 144 and insert 170. Rear wheel assembly 58 is rotatably supported by an axle whose axis of rotation is coincident with axis 128. It is further appreciated that the axis 128 forms an axis of rotation of rear wheel assembly 58, seat stays 70a, 70b, and chain stays 72a, 72b, through the range of motion of the moveable members of rear suspension system 69.

Figure 6:
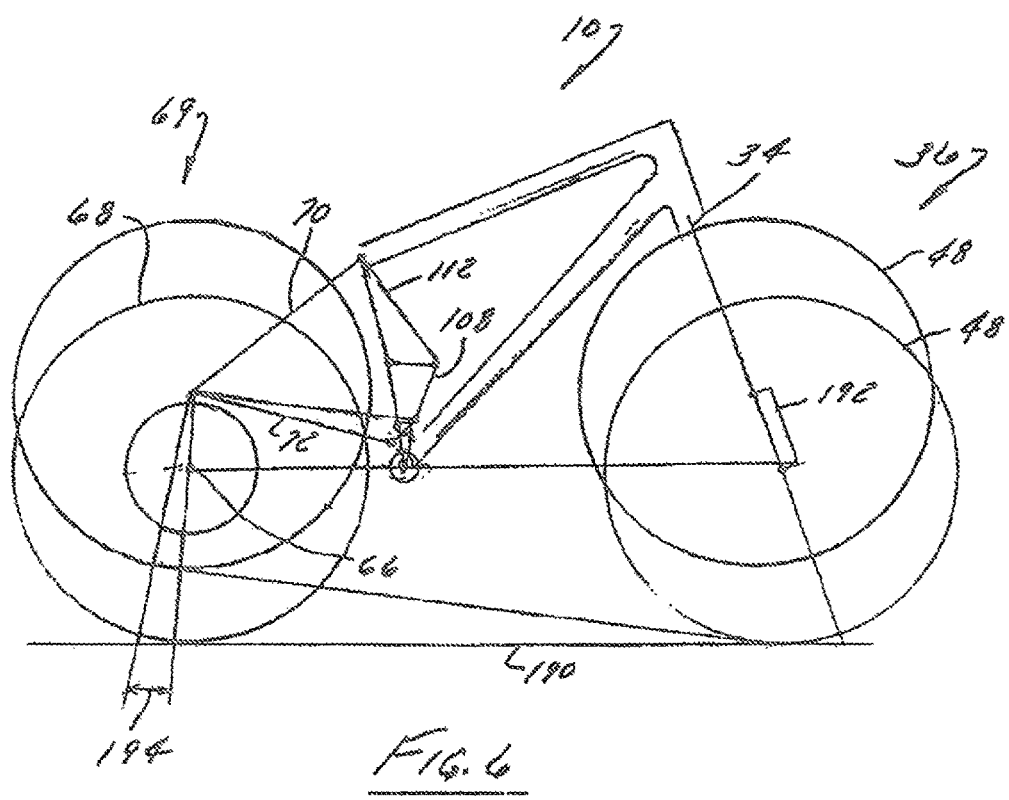
FIG. 6 is a geometric representation of the frame assembly shown in FIG. 2.

FIG. 6 shows a geometrical representation of the operation of suspension system 69. As shown in FIG. 5, as bicycle 10 traverses terrain, indicated by line 190 a shock absorber 192 of front fork 34 absorbs impacts experienced by front wheel assembly 36 thereby allowing the front tire 48 to deflect over the obstruction. A large portion of the shock or impact experienced by rear wheel 68 is absorbed by the collective operation and movement of seat stays 70, chain stays 72, rocker arm 112, and shock absorber 108. Wheel 68 has a normal operation contact patch 194 that is generally centrally positioned beneath the axis of rotation of axle 66. During braking, the concentric orientation of the pivot axis of seat stays 70 relative to chain stays 72 provides for both the substantially vertical translation of axle 66 and a substantially reduced range of translation of contact patch 194 through the movable range of suspension system 69. Preferably, contact patch 194 translates from about 0 to about 7 degrees for a suspension system having about 75 mm to about 250 mm of translation. Understandably, other ranges of contact patch rotation and suspension system travel are envisioned. Accordingly, suspension system 69 provides enhanced operation of the braking system throughout the travel range of the suspension system thereby providing a bicycle that is responsive to the dynamic riding conditions as well as enjoyable to ride.

A bicycle frame assembly according to a combination of aspects of the invention includes a number of rotatable members configured to absorb shocks and impacts associated with operation of the bicycle. The assembly includes a frame constructed to support a rider and a chain stay having a rearward end that extends toward a wheel hub and a forward end that is pivotably connected to the frame. An absorber is pivotably connected to the forward end of the chain stay and extends to a rocker arm that is pivotably connected to the frame. A seat stay is pivotably connected to a rearward end of the rocker arm and extends to the rearward end of the chain stay. The rearward ends of the seat stay and the chain stay are pivotably connected to rotate about a common axis. Such a construction provides a bicycle suspension system that has an absorbing member that is not rigidly connected to a fixed frame member as well as a suspension system with enhanced operation throughout a range of operating positions of the members of the suspension system. The suspension system maintains a reduced contact patch of the rear wheel over the range of motion of the suspension system thereby enhancing operation of the bicycle.

Therefore, one embodiment of the invention includes a bicycle frame assembly having a frame for supporting a rider, a swing arm, and a seat stay. The swing arm has a first end that is pivotably connected to the frame and a second end for pivotably engaging a rear wheel assembly. The seat stay is pivotably connected to the rear wheel assembly such that the seat stay, the swing arm, and a rear wheel have a common axis of rotation.

A bicycle rear wheel suspension system according to another embodiment of the invention includes a number of interconnected links. A first link is pivotably connected to a frame member and has a first section that extends rearward of the frame member for supporting a wheel and a second section that extends forward of the frame member. A rocker arm is pivotably connected to the frame and has a first portion that extends rearward of the frame member and a second portion that extends forward of the frame member. A second link is disposed between the first section of the first link and the first portion of the rocker arm such that the first link and the second link are pivotable about a common axis. The system includes an arrestor that has a first end connected to the second section of the first link and a second end connected to the second portion of the rocker arm.

A further embodiment of the invention includes a bicycle frame having a first portion for supporting a rider and a number of interconnected pivotable members. An arm is pivotably attached to the first portion of the frame. A first member is pivotably attached to the first portion and has a first end and a second end. The first end of the first member is connected to the arm by an absorber. A second member also includes a first end and a second end. The first end is connected to an end of the arm generally opposite the absorber and the second end is pivotably connected to the second end of the first member such that the first and second members are rotatable about a common axis.

The present invention has been described in terms of the preferred embodiment, and it is recognized that equivalents, alternatives, and modifications, aside from those expressly stated, are possible and within the scope of the appending claims.

What is claimed is:
1. A bicycle assembly, comprising:
a bicycle frame;
alternate lateral side chain stays that are pivotably connected to the bicycle frame at a first pivot;
an min pivotably connected to the bicycle frame at a second pivot that is offset from the first pivot;
alternate lateral side seat stays that are pivotably connected to the arm at a third pivot and connected to a respective one of the alternate lateral side chain stays by a respective first insert and a respective second insert associated with a rear wheel axis, each of the first insert and the second insert being configured to receive a rear wheel assembly and further comprising:
a stem constructed to pass through an opening formed in a respective one of the alternate lateral side chain stays and an opening formed in a respective one of the alternate lateral side seat stays, the stem being configured to engage with one of the seat stays or chain stays associated with the respective lateral side and being aligned with the rear wheel axis to allow independent and coaxial rotation of the respective seat stay and the chain stay relative to the axis.

2. The bicycle assembly of claim 1 further comprising a shock absorber coupled to the arm wherein the shock absorber comprises at least one of a spring, a gas charge, and a fluid.

3. The bicycle assembly of claim 2 wherein the shock absorber is coupled to at least one of the respective lateral side chain stays at a forward portion thereof.

4. The bicycle assembly of claim 1 further comprising a rear axle at the rear wheel axis that is coupled to the alternate lateral side seat stays and the alternate lateral side chain stays at the location of the first and second inserts.

5. The bicycle assembly of claim 4 further comprising a wheel that is coupled to the rear axle, wherein the alternate lateral side chain stays, the arm, and alternate lateral side seat stays are configured such that a contact patch of the wheel has a translation range of about 0 degrees to less than about 7 degrees while the axis associated with rotation of the rear wheel has a vertical translation range of 0 mm to a range of about 75 mm to about 250 mm.

6. The bicycle assembly of claim 1 wherein the alternate lateral side chain stays and the alternate lateral side seat stays are oriented to flank a wheel coupled to the alternate lateral side seat stays and the alternate lateral side chain stays at the location of the first and second inserts.

7. The bicycle assembly of claim 1 further comprising a brake caliper connected to one of the alternate side seat stays.

8. The bicycle assembly of claim 1 wherein the first insert and the second insert each include a groove for receiving the rear wheel assembly.

9. The bicycle assembly of claim 1 wherein the rear wheel assembly includes a disc brake assembly having a rotor supported by the rear wheel assembly.

10. The bicycle assembly of claim 9 further comprising a caliper supported by one of the alternate lateral side seat stays that includes at least one brake pad oriented to engage the rotor during actuation of the caliber.

11. A bicycle rear wheel suspension assembly comprising:
    a pair of chain stays that extend along opposite lateral sides of a rear wheel assembly and are pivotably connected to a seat tube;
    an arm pivotably connected to the seat tube;
    a pair of seat stays that extend along the opposite lateral sides of the wheel assembly and are pivotably connected to the arm;
    a first insert constructed to cooperate with a rearward oriented adjacent end of a respective chain stay and seat stay pair that are oriented on a same lateral side of the rear wheel assembly;
    a second insert that is constructed to cooperate with a rearward oriented adjacent end of another respective chain stay and seat stay pair that are oriented on an opposite lateral side of the rear wheel assembly; and
    each of the first insert and the second insert including a stem portion that cooperates with an opening defined by one of the respective chain stay and seat stay pairs such that each stem portion is aligned with an axis of rotation of a rear wheel and allows independent and coaxial rotation of each chain stay and seat stay relative to the axis.

12. The bicycle rear wheel suspension assembly of claim 11 wherein each of the first insert and the second insert includes a head portion that cooperates with one of a respective seat stay and chain stay to prevent rotation of the respective insert relative to the axis.

13. The bicycle rear wheel suspension assembly of claim 12 wherein each head portion further comprises a pocket that is configured to align the rear wheel with an axle opening of the respective insert and is configured to allow the rear wheel to drop out when the rear axle is removed.

14. The bicycle rear wheel suspension assembly of claim 13 wherein each pocket is tapered in a vertically downward facing direction.

15. The bicycle rear wheel suspension assembly of claim 13 wherein each head portion nests in a pocket formed in a laterally inboard facing side of a respective chain stay.

16. A method of forming a rear wheel suspension bicycle assembly, the method comprising:
    connecting a first chain stay and a second chain stay to a forward portion of a bicycle frame such that the first chain stay and the second chain stay are pivotable relative to the forward portion of the bicycle frame;
    connecting an arm to the bicycle frame so that the arm is pivotable relative to the bicycle frame;
    connecting a first seat stay and a second seat stay to the arm so that the first seat stay and the second seat stay are pivotable relative to the arm;
    connecting a rearward oriented end of the first chain stay and the first seat stay with a first insert that passes through the first chain stay and the first seat stay such that the first chain stay and the first seat stay are pivotable relative to the one another about an axis defined by a stem portion of the first insert;
    connecting a rearward oriented end of the second chain stay and the second seat stay with a second insert that passes through the second chain stay and the second seat stay such that the second chain stay and the second seat stay are pivotable relative to one another about an axis defined by a stem portion of the second insert; and
    securing a rear wheel assembly between the first insert and the second insert such that an axis of rotation of a rear wheel is coaxial with the axis of rotation defined by the first insert and the axis defined by the second insert.

17. The method of claim 16 further comprising forming a cavity in a laterally inboard facing side of at least two of the first chain stay, the second chain stay, the first seat stay, and the second seat stay and shaping each respective cavity to receive a head portion of a respective one of the first insert and the second insert.

18. The method of claim 17 further comprising nesting the head portion of one of the cavities to prevent rotation of the respective one of the first insert and the second insert about the axis of rotation.

19. The method of claim 16 further comprising forming a tapered pocket in each of the first insert and the second insert that allows the rear wheel assembly to be selectively dropped in a vertical direction out of engagement with the first insert and the second insert.

20. The method of claim 16 further comprising connecting a damper between the arm and each of the first chain stay and the second chain stay.

* * * * *

UNITED STATES PATENT AND TRADEMARK OFFICE
CERTIFICATE OF CORRECTION

PATENT NO. : 10,106,221 B2  
APPLICATION NO. : 15/168719  
DATED : May 31, 2016  
INVENTOR(S) : Colegrove et al.

It is certified that error appears in the above-identified patent and that said Letters Patent is hereby corrected as shown below:

In the Specification

Column 1, Line 34, Add --,-- after top tube and down tube

Column 1, Line 46, Replace "winch" with --which-- and Add the word --the-- as follows: drive mechanism which powers the bicycle. The seat tube Column 4, Line 3, Replace the first "can" with --and--

In the Claims

Claim 1, Column 8, Line 50, Replace "min" with --arm--

Signed and Sealed this  
Twenty-ninth Day of January, 2019

Andrei Iancu  
*Director of the United States Patent and Trademark Office*